United States Patent [19]
Mehta et al.

[11] Patent Number: 6,092,142
[45] Date of Patent: Jul. 18, 2000

[54] METHOD AND APPARATUS TO INTRODUCE PROGRAMMABLE DELAYS WHEN REPLAYING ISOCHRONOUS DATA PACKETS

[75] Inventors: Kalpesh Mehta; Krishna Shetty; Sailesh Bissessur, all of Chandler, Ariz.; Seng Thien Yap, Folsom, Calif.

[73] Assignee: Intel Corporation, Santa Clara, Calif.

[21] Appl. No.: 09/031,390

[22] Filed: Feb. 26, 1998

[51] Int. Cl.[7] .................................................. G06F 13/00
[52] U.S. Cl. ............................................. 710/131; 710/38
[58] Field of Search .............................. 709/103; 710/38, 710/40, 114, 121, 131

[56] References Cited

U.S. PATENT DOCUMENTS

| | | | |
|---|---|---|---|
| 5,291,459 | 3/1994 | Andersen | 367/134 |
| 5,958,014 | 9/1999 | Cave | 709/229 |
| 5,970,253 | 10/1999 | Purdham | 395/732 |
| 5,983,299 | 11/1999 | Qureshi | 710/107 |

*Primary Examiner*—Paul R. Myers
*Attorney, Agent, or Firm*—Blakely, Sokoloff, Taylor & Zafman LLP

[57] ABSTRACT

A method and apparatus for introducing a programmable delay during replay of isochronous data packets is described. The method includes, determining an initial delay point. In particular, the initial delay point is determined by the transmission rate, playback rate, and the desired buffer storage size. The method also includes, introducing a programmable delay to synchronize playback of multiple data streams across multiple destination devices. The apparatus includes, a buffer, a switching device, a counter, and control logic to insert the programmable delay.

10 Claims, 5 Drawing Sheets

METHOD AND APPARATUS TO INTRODUCE PROGRAMMABLE DELAYS WHEN REPLAYING ISOCHRONOUS DATA PACKETS

FIELD OF THE INVENTION

The present invention relates to inserting a delay while replaying data received from a network. More particularly, the present invention relates to inserting a programmable delay while replaying isochronous data received from a Universal Serial Bus ("USB").

BACKGROUND

Improvements in communications networks has led to new designs that support high bandwidths and multiple devices. In conjunction with the advent of improved communication networks, microprocessors with high operating frequencies and large memory storage are also being developed. Accordingly, the combination of high bandwidth communication networks and high speed microprocessors has resulted in standard text communication being replaced with multimedia communication. Multimedia communication describes using a combination of audio, video, and/or text to communicate between remote devices. To support multimedia communication, multimedia applications provide a wide range of peripherals connected to a computer system. The peripherals range from digital joysticks, scanners, digital speakers, digital cameras, to personal computer telephones.

Typically, in multimedia communication a segment of data is digitized and divided into packets for transmission across a high bandwidth communication network to a destination device. Subsequently, the destination device receives the transmitted packets and regenerates the segment of data. High speed communication networks and high speed processors create performance gains that allow the transfer and processing of the large volumes of data associated with multimedia communication. High speed communication networks, however, do not create performance gains during real time multimedia communication between peripherals coupled to a computer system.

In real time multimedia communication, time varying signals that require serial processing are transmitted across a network that couples different peripherals. Typical networks create performance loss in real time multimedia communication because packets are indiscriminately delayed during transmission. Accordingly, during serial processing of received packets the data included in a delayed packet is simply lost, thus resulting in audio or visual distortion. Another disadvantage of a typical networks is that no guaranteed bandwidth exist, thus the rate of real time communication is varied between remote devices resulting in signal distortions. Yet another disadvantage of typical networks results from configuration requirements. Connecting multimedia peripherals via typical networks requires reconfiguration of the computer system. Typically, the reconfiguration requires opening the computer system and manipulating dip switches or adding peripheral cards.

To counteract the performance loss associated with typical networks, a universal serial bus ("USB") system was developed in the prior art. USB systems provide a transmission media with a guaranteed bandwidth and bounded delays between packet reception. USB systems also provide a robust interface that allows multiple peripheral devices to couple to a computer system without reconfiguration concerns.

FIG. 1 illustrates a network system 100 using a USB. In particular, the output of source 105, data 110, is coded in code 115 for transmission along USB 130. Subsequent to the coding process, packetizer 120 generates individual packets of data for transmission along USB 130. The data is then transmitted to either a single destination device, destination 140, or data streams are generated and transmitted to two destination devices, destination 140 and destination 150.

To maintain a guaranteed transmission bandwidth between devices, USB 130 uses an identified periodic event, such as a start of frame ("SOF"), to schedule packet transmission. FIG. 2 illustrates the timing of SOF packets in USB 130. In particular, for every SOF time period along time frame 200, system 100 transmits a packet along USB 130. Accordingly, transmitted packet 215 is received by a destination device prior to SOF 220. Similarly, packet 225 is received prior to SOF 230 and packet 235 is received prior to SOF 240. Thus, the arrival or transmission of a given packet is bounded between a SOF time period resulting in a defined transmission bandwidth. One disadvantage of this approach is that variable loading from alternate sources deviates the arrival of a packet within a SOF period, thus creating data distortion during regeneration of transmitted data.

To counteract the variable delay of a packet within an SOF period, some destination devices use a replay strategy. Typically, the replay strategy includes generating parallel data from a serial network input and storing the parallel data in a first-in-first-out ("FIFO") buffer. The FIFO buffer stores the parallel data in a first SOF time period and outputs the data in a subsequent SOF time period, thus removing the variable delay in packet arrival. One disadvantage of this approach is the required buffer size. Typically, the FIFO buffer must be able to store data equivalent to twice the size of the transmitted packet. A large FIFO is necessary to ensures adequate storage space when a packet has a maximum delay in a first frame and a packet in the subsequent frame is received immediately following a SOF event signal. A second disadvantage of this approach is that buffered data is outputted only after a subsequent SOF signal, thus creating a significant delay in the regeneration/playback of transmitted data. Another disadvantage of this approach is that the buffer design requires processor intervention to ensure synchronization between multiple data streams transmitted to multiple destination devices.

SUMMARY OF THE INVENTION

A method for introducing programmable delay during replay of isochronous transmitted data. The method comprises the steps of selecting data from a first device during a first time period and replaying the selected data during the first time period. The method also includes determining whether said isochronous transmitted data is available on an input and selecting data from said input for a second time period, provided said isochronous transmitted data is available. Provided the isochronous transmitted data is unavailable, data is selected from the first device for a second time period.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method and apparatus for adding a programmable delay to the output of a FIFO buffer in a destination device is disclosed. The addition of the delay is dependent on a set of conditions—namely, the desired data playback rate, the network bandwidth, and the FIFO size. For one embodiment, the programmable delay is used to synchronize multiple data streams transmitted to multiple destination devices. For an alternative embodiment, the programmable delay is used to reduce FIFO size.

An intended advantage of an embodiment of the present invention is to reduce the playback delay on the output of a FIFO buffer included in a network destination device via a programmable delay.

Another intended advantage of an embodiment of the preset invention is to reduce the FIFO size in a destination device coupled to a USB network. The FIFO size is reduced by introducing a programmable delay that allows playback of a packet in the same SOF period the packet is received. The reduced FIFO size allows the addition of external components to the destination device. For one embodiment, the external components added to the destination device are used to enhance multimedia communication. In an alternative embodiment, the reduced FIFO size provides for a more compact destination device.

Yet another intended advantage of an embodiment of the present invention is to reduce processor interaction during synchronized data play back. In particular, by introducing a programmable delay to the FIFO output a reference that provides a synchronization point for multiple data streams is created. The reference point removes the need for processor synchronization during data playback between multiple destination devices.

In multimedia communication data received over a network is temporarily stored in a FIFO buffer prior to playback. The storing, decoding, and playback (i.e. regeneration) of data is done in a destination device coupled to the network. Typically, the data is transferred through isochronous data packets to ensure a set bandwidth. For one embodiment, a USB network is used to provided the transmission media. Accordingly, the destination device is coupled to the USB network to receive the transmitted data. The data is received in packets with each packet arriving within the SOF timing period of the particular USB network.

Figure 1:
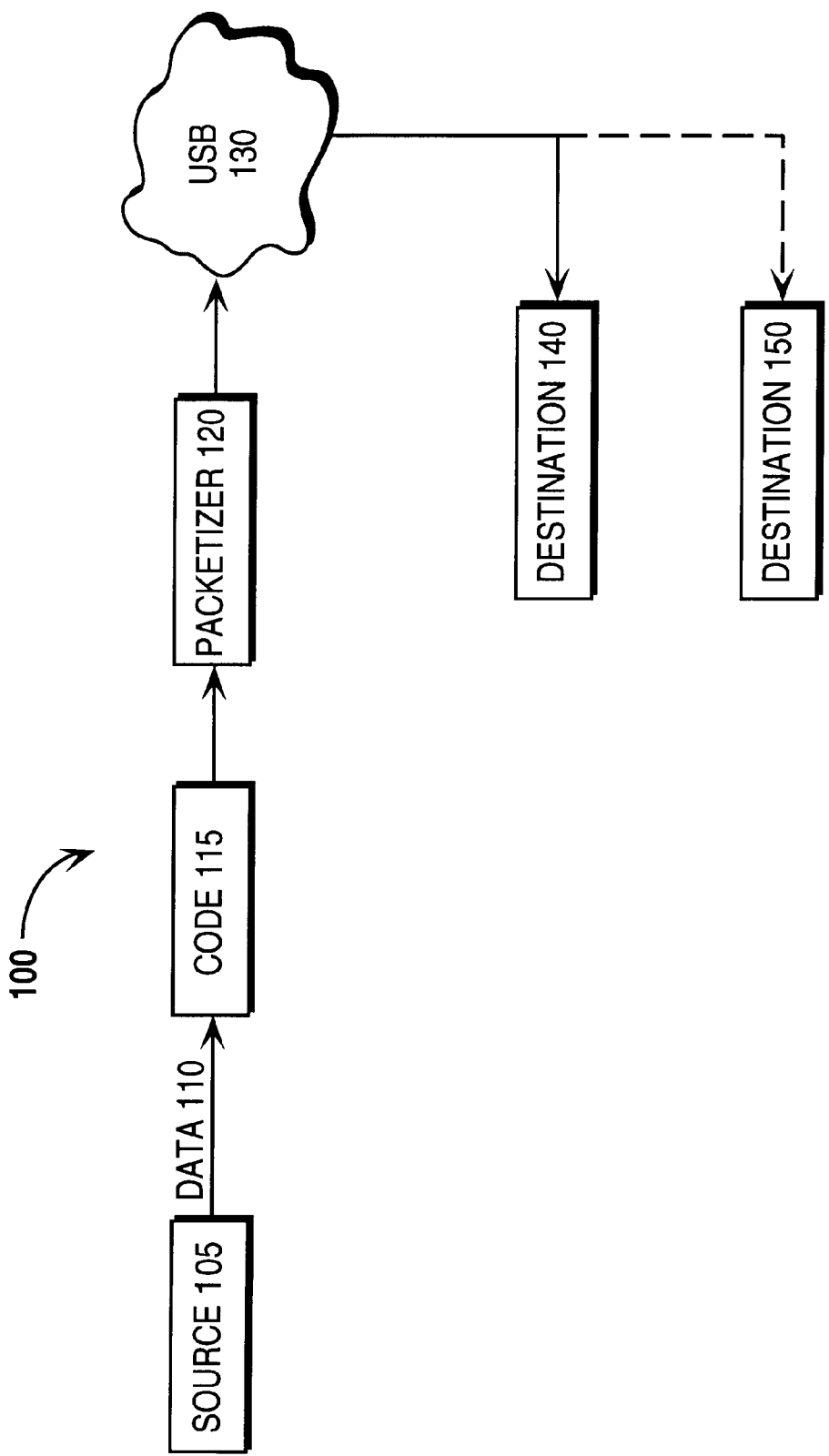
FIG. 1 shows a prior art Universal Serial Bus.
Figure 2:
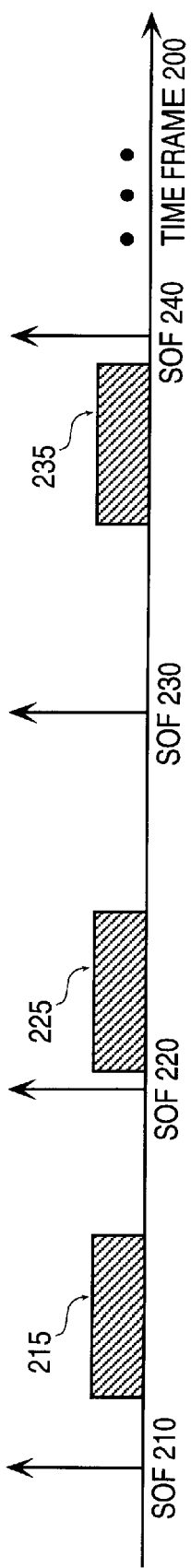
FIG. 2 shows a prior art timing signal for a Universal Serial Bus.
Figure 3:
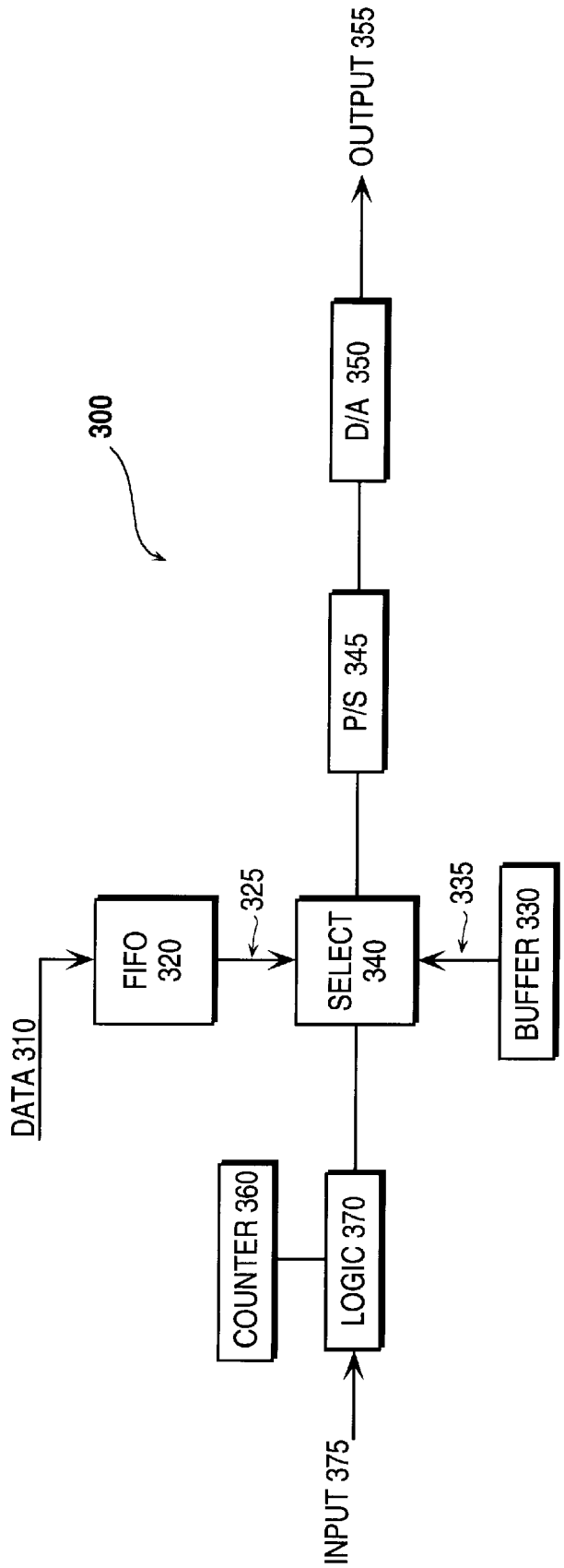
FIG. 3 shows one embodiment of a destination device.

FIG. 3 illustrates one embodiment of a destination device. Destination device 300 includes input data 310 coupled to FIFO 320. FIFO 320 is used to temporarily store data from data 310 prior to playback. FIFO 320 is also coupled to select 340. Select 340 is coupled to logic 370, buffer 330, and parallel-to-serial device P/S 345. Select 340 is used to select between the output of FIFO 320, line 325, and the output of Buffer 330, line 335. Buffer 330 is a pad buffer that outputs a sample of "0" values. Accordingly, select 340 switches between a "0" sample value or the output of FIFO 320. In one embodiment, buffer 330 outputs a unique sample value that is interpreted as a pause or no signal by D/A 350. In an alternative embodiment, select 340 is a multiplexing device.

The selected output is passed to P/S 345. P/S 345 converts parallel data to serial data. A data clock (not shown) is used by destination device 300 to synchronize data moved from an output selected by select 340 to P/S 345. For one embodiment, a packet of data received on data 310 includes "$N_1$" samples of data. Accordingly, in each data clock cycle, P/S 345 converts a sample of data into a stream of serial data. The serial data is converted to analog data by D/A 350. D/A 350 provides the analog data on output 355. For one embodiment, output 355 is a video signal. For an alternative embodiment, output 355 is an audio signal.

Logic 370 is also coupled to counter 360 and input 375. Input 375 is set active when new data is available on data 310. Input 375 is reset when no data is available on data 310. For one embodiment, destination device 300 is coupled to a USB network via data 300. Accordingly, input 375 is set at the arrival of a packet and reset at the beginning of an SOF.

Counter 360 is a pre-settable counter that loads a predetermined value. The value loaded into counter 360 is used to determine the time period that select 340 selects an output. In particular, counter 360 is timed via data clock. Accordingly, a value loaded into counter 360 is decremented in every data clock cycle until the loaded value reaches "0". When the counter output is a "0", dependent on logic 370's output, select 340 transitions to a different output.

For example, $N_1$ is loaded into counter 360. Accordingly, select 340 remains on a selected output for a time period equivalent to P/S 345 converting a packet length of data. In particular, while $N_1$ is decremented in every data clock cycle, P/S 345 converts a sample from a selected output. After $N_1$ cycles, $N_1$ samples of data are removed from FIFO 320 or generated by buffer 330. As previously explained, a transmitted packet includes $N_1$ samples, thus loading $N_1$ into counter 360 allows the playback of one packet length of data from a selected output.

For one embodiment, subsequent to an initial SOF a value "$M_0$" is loaded into counter 360. $M_0$ is a preprogrammed delay added to the initial playback of a transmitted signal. Accordingly, if the same $M_0$ is used across multiple destination device, $M_0$ provides a synchronization point for multiple data streams. In another embodiment, destination device 300 is coupled to a USB network and $M_0$ is less than the period of a subsequent SOF event. Accordingly, data playback is possible in the same SOF time period the data is received. In yet another alternative embodiment, based on data input and playback rates, $M_0$ is selected to minimize FIFO size requirements.

Logic 370 controls the switching point of select 340 to ensure minimum distortion on output 355. Logic 370 also reduces the required size of FIFO 320 by controlling the switching point of select 340. Using data from input 375 and counter 360's output, logic 370 determines the transition/switching points of select 340. Accordingly, select 340 selects from FIFO 320 or buffer 330. For one embodiment, the set of conditions used to determine the transition points of select 340 follows a state diagram.

Figure 4:
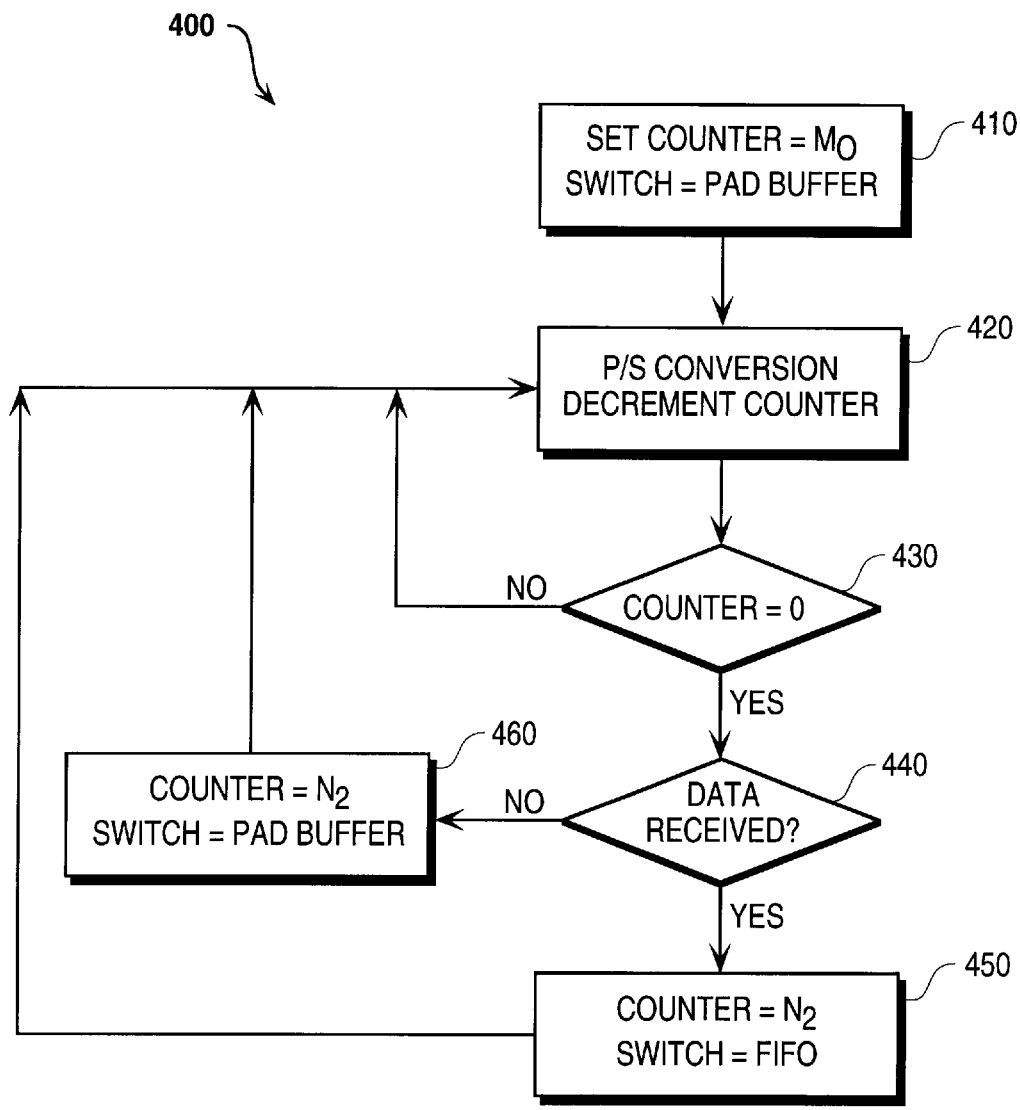
FIG. 4 shows one embodiment of a state machine diagram for switching an output between a FIFO and a pad buffer.

FIG. 4 illustrates one embodiment of logic 370's state transitions. State 410 through 460, of state diagram 400, identify switching points used by logic 370. In particular, state 410 is used to determine the initial delay for playback. States 420 through 460, however, are used to maintain FIFO levels and ensure minimum output distortion.

In state 410, counter 360 is loaded with the value $M_0$ and select 340 switches to buffer 330. For one embodiment, destination device 300 is coupled to a USB network. Accordingly, state 410 occurs prior to an initial SOF.

Subsequently, state diagram 400 transitions to state 420. In state 420, parallel to serial conversion is performed on the selected output and $M_0$ is decremented. For one embodiment, each data clock cycle results in a sample of data converted from parallel data to serial data by P/S 345. Further, each data clock cycle results in counter 360 decrementing a value of "1" from $M_0$. After the counter is decremented and the serial conversion of a sample occurs state diagram 400 transitions to state 430.

State 430 maintains the selected output until counter 360 reaches a value of "0." In particular, provided that the counter has not reached a value of "0," the state machine returns to state 420. As previously described, in state 420 the loaded counter value is decremented and a parallel to serial conversion of the new sample data is performed. Provided the counter value decrements to "0" state diagram 400 transitions to state 440.

In state 440, state diagram 400 determines whether new data has been received. Provided new data is received state diagram 400 transitions to state 450. If no new data is received state diagram 400 transitions to state 460. For one embodiment, destination device 300 is coupled to a USB network. Accordingly, new data is received in the form of a packet on input data 310.

In state 450, counter 360 is reset to a value of "$N_2$" and the output of FIFO 320 is selected. In state 460, counter 360 is also reset to a value of $N_2$, however, the output of buffer 330 is selected instead of FIFO 320. In both state 450 and state 460, provided the appropriate output is selected and counter 360 is reset, state diagram 400 transitions to state 420. For one embodiment, $N_2$ equals $N_1$, the number of samples in a received packet. Accordingly, a transition to state 450 results in playback of a packet of data stored in FIFO 320. Similarly, a transition to state 460 results in playback of a packet length of "0" value data from buffer 330. In alternative embodiments, buffer 330 outputs a unique sample value that is interpreted as a pause or no signal by D/A 350. Accordingly, this unique value is replayed in state 460 when buffer 330 is selected.

For one embodiment, following the transitions in state diagram 400 logic 370 minimizes output distortion by reducing the delay in data playback. In an alternative embodiment, following state diagram 400, logic 370 ensures a reduced FIFO size in destination device 300 by allowing the playback of received data in the same SOF period the data was received.

For example, in one embodiment, destination device 300 is coupled to a USB network with a transmission rate of 12 mega bits per second ("Mb/s") and a SOF period of one millisecond ("ms"). Further, the USB network transmits a packet occupying two-thirds of a SOF period, a packet length of one kilo byte ("KB"). In the present example, $M_0$ is set to 0.4 ms. Accordingly, the initial FIFO size prior to playback is 0.6 KB (12 Mbs/s* 0.4 ms). The required FIFO size is determined by the initial FIFO size plus the additional FIFO storage used during playback.

The FIFO size used during playback is determined by the playback rate and the amount of new data received. According to the present embodiment, destination device 300's data clock has a period of 1 microsecond ("us"). Thus, P/S 345 converts data at a rate of 8 Mb/s, resulting in a playback rate of 8 Mb/s. The initial FIFO size of 0.6 KB results in 0.4 KB of new data that must be received during playback. At a rate of 12 Mb/s, the destination device receives 0.4 KB of new data after 0.267 ms. Simultaneous to the incoming data, the FIFO size increases at a rate of 4 Mb/s because incoming data arrives at a rate of 12 Mb/s and the playback rate is 8 Mb/s. Accordingly, the FIFO stores an additional 0.14 KB of data while the remaining packet is being received. Thus, in the present example a FIFO size of 0.74 KB (0.6 KB+0.14 KB) is required.

Figure 5:
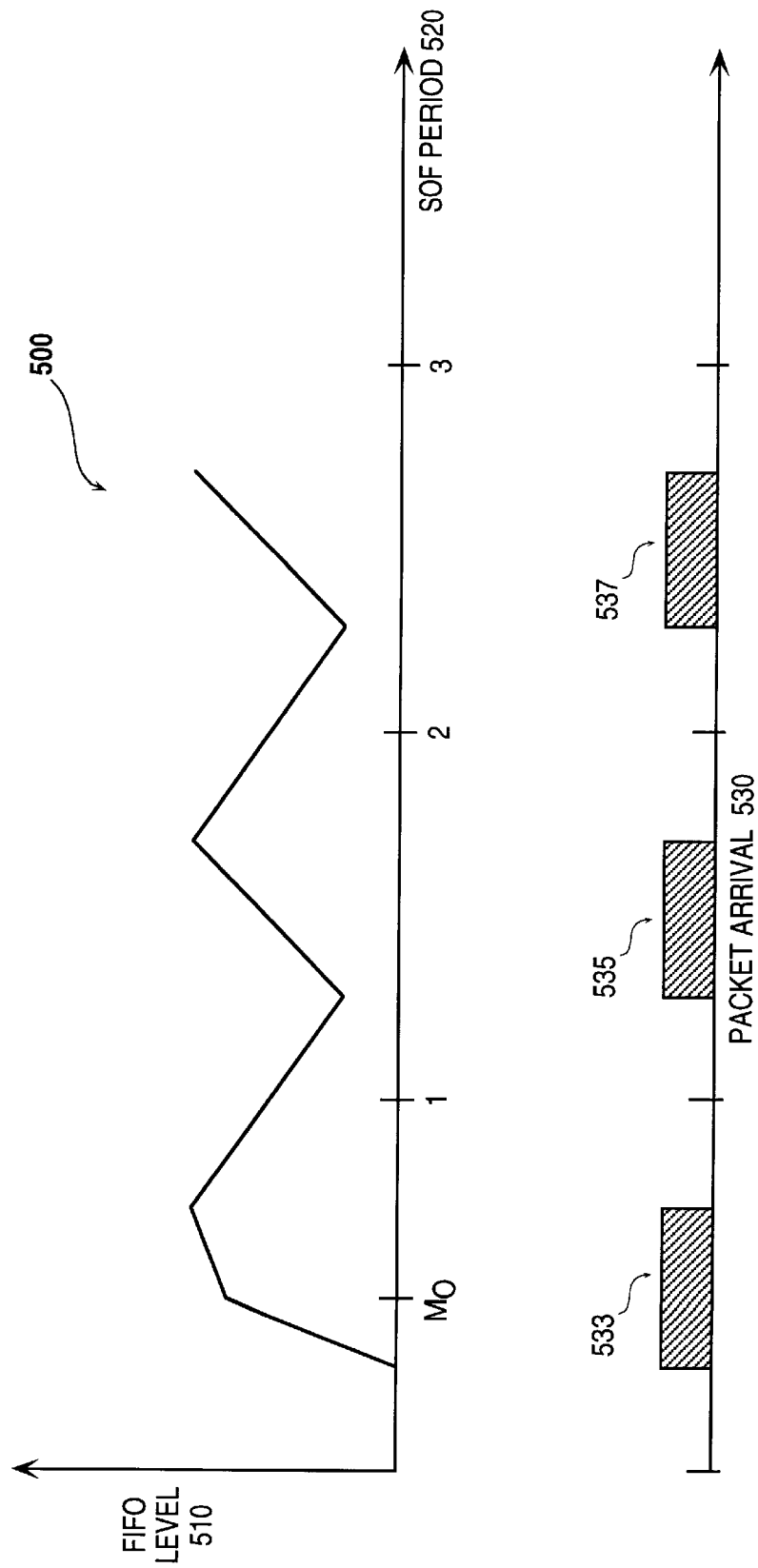
FIG. 5 shows one embodiment of a timing diagram showing data storage in a FIFO.

FIG. 5 illustrates one embodiment of a graph showing FIFO storage levels. In particular, graph 500 includes a vertical axis FIFO level 510 and a horizontal axis SOF period 520. The vertical access illustrates the FIFO storage level in destination device 300. The horizontal access illustrates the timing of SOF event signals. Graph 500 also includes a packet arrival table. In particular, packet arrival 530 illustrates the arrival time of packets 533, 535, and 537 relative to the SOF signals on horizontal access 520. For example, packet 533 arrives prior to SOF 1. Similarly, packet 535 and packet 537 arrive prior to SOF signal 2 and 3, respectively.

Horizontal access 520 includes point $M_0$. Point $M_0$ illustrates the initial delay from SOF 0 until logic 370 selects the output of FIFO 320. The initial delay is also illustrated in state 410, 420, and 430 of state diagram 400. As previously described, by varying the delay based on transmission and data playback rates the required storage size of FIFO 320 is reduced. In alternative embodiments, $M_0$ is also used to define a synchronization point for multiple destination devices.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for introducing programmable delay during replay of isochronous transmitted data, said method comprising:

(A) selecting data from a first device during a first time period;

(B) replaying selected data for said first time period;

(C) determining whether said isochronous transmitted data is available on an input;

(D) selecting data from said input provided said isochronous transmitted data is available;

(E) selecting data from said first device provided said isochronous transmitted data is unavailable; and (F) replaying selected data for a second time period.

2. The method of claim 1 further comprising repeating steps (D–F).

3. The method of claim 1 wherein said first time period is smaller than a start of frame ("SOF") period.

4. The method of claim 1 wherein said first time period synchronizes replay between multiple devices.

5. The method of claim 1 wherein said first time period is selected to reduce memory requirements of a second device used to temporarily store said isochronous transmitted data.

6. The method of claim 1 wherein said second time period is selected to reduce memory requirements of a second device used to temporarily store said isochronous transmitted data.

7. An apparatus operable to introduce a programmable delay during replay of isochronous transmitted data, said apparatus comprising:

a first circuit coupled to an input, said first circuit storing said isochronous transmitted data available on said input;

a second circuit, said second circuit storing pad values; and a select logic coupled to said first circuit, said second circuit, and an output, said select logic operable to selectively couple said output between said first circuit and said second circuit, wherein said select logic coupling said output and said second circuit for a first time period.

8. The apparatus of claim 7 wherein said selective coupling further comprises:

said select logic selecting said first circuit subsequent to said first time period provided said isochronous transmitted data is available on said input; and said select logic switching between said first circuit and said second circuit after a second time period, said switching dependent on whether said isochronous transmitted data is available on said input.

9. The apparatus of claim 7 wherein said first time period is used to synchronize data replay between multiple devices.

10. The apparatus of claim 6 wherein said first time period is used to reduce storage size of said first circuit.

* * * * *